(12) United States Patent
Li

(10) Patent No.: US 9,143,286 B2
(45) Date of Patent: Sep. 22, 2015

(54) ESTIMATION OF SIGNAL TO NOISE RATIO IN RECEIVERS

(75) Inventor: Yunxin Li, Vaucluse (AU)

(73) Assignee: Nitero Pty Limited, Fitzroy (AU)

( * ) Notice: Subject to any disclaimer, the term of this patent is extended or adjusted under 35 U.S.C. 154(b) by 352 days.

(21) Appl. No.: 13/522,908

(22) PCT Filed: Jan. 18, 2011

(86) PCT No.: PCT/AU2011/000047
§ 371 (c)(1),
(2), (4) Date: Sep. 12, 2012

(87) PCT Pub. No.: WO2011/088501
PCT Pub. Date: Jul. 28, 2011

(65) Prior Publication Data
US 2013/0023219 A1    Jan. 24, 2013

(30) Foreign Application Priority Data
Jan. 19, 2010 (AU) ................................ 2010900197

(51) Int. Cl.
*H04B 17/00* (2015.01)
*H04L 1/20* (2006.01)
*H04B 17/336* (2015.01)
*H04L 27/26* (2006.01)

(52) U.S. Cl.
CPC .............. *H04L 1/206* (2013.01); *H04B 17/336* (2015.01); *H04L 27/2647* (2013.01)

(58) Field of Classification Search
CPC .......................... H04B 17/336; H04L 25/0204
USPC ..................... 455/130, 226.1, 226.3
See application file for complete search history.

(56) References Cited

U.S. PATENT DOCUMENTS

| | | | |
|---|---|---|---|
| 6,128,494 A | 10/2000 | Rozmaryn | |
| 6,317,456 B1 | 11/2001 | Sayeed | |
| 6,377,607 B1* | 4/2002 | Ling et al. ..................... | 375/130 |
| 6,442,495 B1 | 8/2002 | Fleming-Dahl | |

(Continued)

FOREIGN PATENT DOCUMENTS

| | | |
|---|---|---|
| EP | 1 267 540 | 12/2002 |
| GB | 2 395 624 | 5/2004 |

(Continued)

OTHER PUBLICATIONS

IP Australia, "Patent Examination Report No. 1" in application No. 2011207101, dated May 15, 2014, 2 pages.

(Continued)

*Primary Examiner* — Ayodeji Ayotunde
(74) *Attorney, Agent, or Firm* — Hickman Palermo Backer Bingham LLP

(57) ABSTRACT

This invention concerns the estimation of signal to noise ratio (SNR) at a communications receiver; it may be applicable to a wide range of receivers but is particularly suited for Orthogonal Frequency Division Multiplexing (OFDM) receivers. In particular the invention is a method, a receiver and software for performing the method. The signal to noise ratio (SNR) in the received signals is estimated by directly estimating the power ratio, in the received signal, between the part of the frequency spectrum of the received signal that contains only noise, and the part of the spectrum that contains both signal and noise; and averaging this value over a time interval.

12 Claims, 6 Drawing Sheets

(56) References Cited

U.S. PATENT DOCUMENTS

| | | | |
|---|---|---|---|
| 6,456,653 B1* | 9/2002 | Sayeed | 375/227 |
| 6,532,258 B1 | 3/2003 | Goldston et al. | |
| 6,678,512 B1* | 1/2004 | Kaminski et al. | 455/334 |
| 6,717,976 B1 | 4/2004 | Shen | |
| 7,027,496 B2 | 4/2006 | Tapaninen | |
| 7,190,741 B1 | 3/2007 | Manning | |
| 7,215,930 B2 | 5/2007 | Malladi | |
| 7,289,388 B2 | 10/2007 | Intrator et al. | |
| 7,313,167 B2 | 12/2007 | Yoon et al. | |
| 7,356,071 B2 | 4/2008 | Li et al. | |
| 7,362,801 B2 | 4/2008 | Goel | |
| 7,366,137 B2 | 4/2008 | Abrishamkar et al. | |
| 7,376,178 B2 | 5/2008 | Li et al. | |
| 7,570,722 B1 | 8/2009 | Lee et al. | |
| 7,590,172 B2 | 9/2009 | Li et al. | |
| 7,756,003 B1 | 7/2010 | Lee et al. | |
| 2002/0110138 A1* | 8/2002 | Schramm | 370/430 |
| 2004/0110510 A1* | 6/2004 | Jeon et al. | 455/450 |
| 2007/0168407 A1 | 7/2007 | Prasad et al. | |
| 2007/0281640 A1* | 12/2007 | Coupain et al. | 455/130 |
| 2008/0240217 A1* | 10/2008 | Lee et al. | 375/227 |
| 2009/0092179 A1 | 4/2009 | Chang et al. | |
| 2009/0141786 A1* | 6/2009 | Park et al. | 375/227 |
| 2009/0209253 A1* | 8/2009 | Lewis | 455/434 |
| 2010/0008217 A1* | 1/2010 | Ding et al. | 370/210 |
| 2010/0054319 A1 | 3/2010 | Lee | |

FOREIGN PATENT DOCUMENTS

| | | |
|---|---|---|
| WO | 2007/113511 | 10/2007 |
| WO | 2008/066338 | 6/2008 |
| WO | 2008/082117 | 7/2008 |
| WO | WO 2011/088501 A1 | 7/2011 |

OTHER PUBLICATIONS

Yunxin, "Blind SNR estimation of OFDM signals,", *2010 International Conference on Microwave and Millimeter Wave Technology (ICMMT)*, pp. 1792-1796, May 8-11, 2010.

Xu, H. et al., "A novel SNR estimation algorithm for OFDM," *2005 Vehicular Technology Conference*, pp. 3068-3071 vol. 5, May 30-Jun. 1, 2005.

International Search Report, PCT/AU2011/000047; completion date: Apr. 14, 2011; 4 pages.

Written Opinion, PCT/AU2011/000047; completion date: Apr. 14, 2011; 4 pages.

* cited by examiner

Fig. 3... cont'd
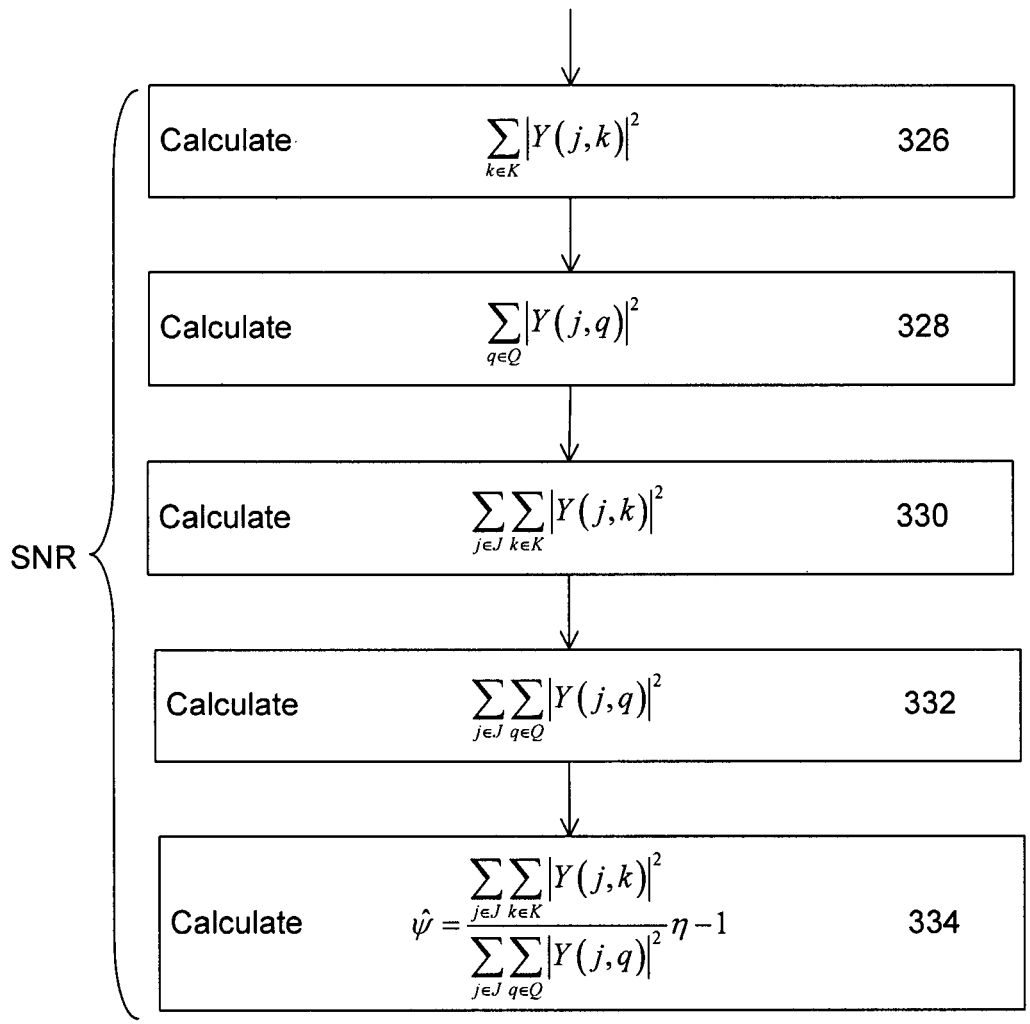

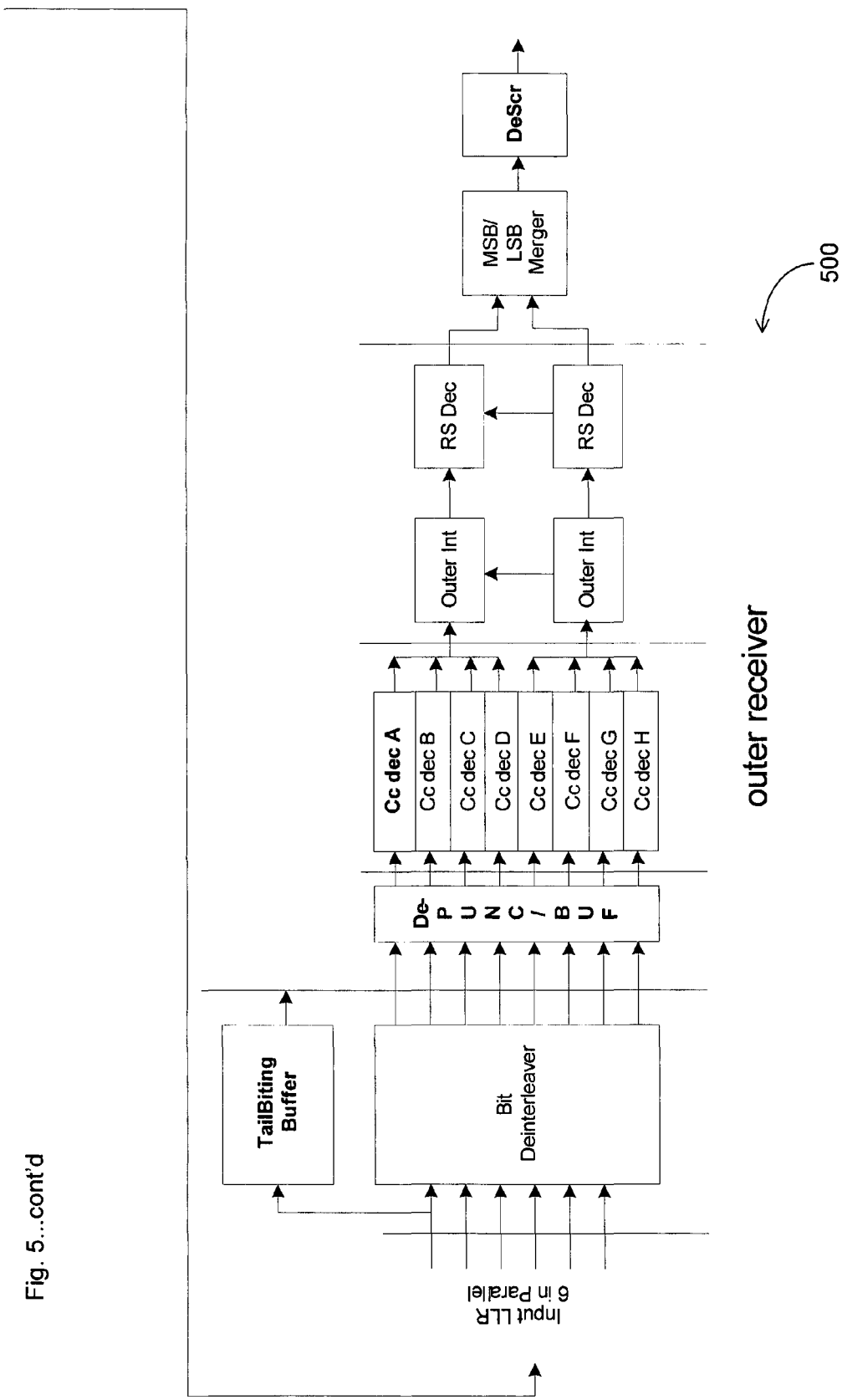
Fig. 5...cont'd

ESTIMATION OF SIGNAL TO NOISE RATIO IN RECEIVERS

TECHNICAL FIELD

This invention concerns the estimation of signal to noise ratio (SNR) at a communications receiver; it may be applicable to a wide range of receivers but is particularly suited for Orthogonal Frequency Division Multiplexing (OFDM) receivers. In particular the invention is a method, a receiver and software for performing the method.

BACKGROUND ART

The invention will be described primarily in the context of Orthogonal Frequency Division Multiplexing (OFDM) which is the dominant multiplexing and modulation technique used in wireless communications. OFDM transmits multiple data streams by assigning each of them uniquely to one or more of a large number of sub-carriers where each sub-carrier operates at a unique carrier frequency (tone). The adjacent sub-carrier frequencies or tones have a fixed frequency difference between them. The data is carried in each sub-carrier by modulating its amplitude or phase, or both. In practice many of the sub-carriers are not used, typically the unused sub-carriers include a small number at the centre of the transmission band, and a block at both edges of the transmission band.

At the transmitter (TX), OFDM enables the efficient use of the available channel bandwidth and the easy control of the signal spectrum mask.

At the Receiver (RX), OFDM allows simple equalization and is robust to constant timing offset due to the adoption of a Cyclic Prefix (CP) in the transmission. However, to optimize the system performance, the receiver is often required to estimate the signal to noise ratio (SNR). For instance, knowledge of the SNR is useful for clear channel assessment, soft-decision channel decoding, Transmitter power control, adaptive coding and modulation, bit loading and hand-off.

SNR estimation has been investigated, especially in the context of single carrier (SC) modulation schemes [1-4]. Some of the SC SNR estimation schemes can be directly adapted to OFDM modulation [5], and these can be classified into two broad categories:
  data-aided (DA), and
  non-data-aided (NDA), which are also called 'blind' schemes.

Data-aided schemes require some known data to be transmitted, for example, in some preselected pilot subcarriers in the Payload field. Alternatively, one or more training OFDM symbols can be transmitted in the Preamble or the Channel Estimation fields. OFDM SNR estimation schemes can further be divided into time-domain (TD) and frequency-domain (FD) processing algorithms.

References [6-9] describe known blind OFDM SNR estimation algorithms that can be applied to the Payload field without the requirement of preselecting the pilot subcarriers. The time domain signal during the Cyclic Prefix (CP) interval and towards the end of the OFDM symbol are highly correlated. In [6, 7], this correlation is used for SNR estimation. The disadvantage of this approach is that the number of useable samples in one OFDM symbol is very small due to the fact that most of the CP interval is interfered by the previous OFDM symbol. As a result a large number of OFDM symbols are needed to achieve accurate estimation.

By assuming that the signal and noise covariance matrices are different and known, a Maximum-Likelihood (ML) method with high computational complexity is proposed in [8].

The expectation maximization (EM) algorithm is used in [9]. However, the algorithm assumes knowledge of the channel and is therefore dependent on channel estimation accuracy.

DISCLOSURE OF THE INVENTION

The invention is a method for estimating the Signal to Noise Ratio (SNR) of received RF signals, including those having multiple sub-carriers, comprising:

Converting the analogue RF signal to digital samples at a sampling frequency that is more than twice the RF signal bandwidth.

Transforming the digital signal to the frequency domain.

Estimating the power of some or all of the signal samples in the frequency domain.

Estimating the signal to noise ratio of the received signal, or of selected samples of the received signal, from the ratio of:

The power of samples that include signal plus noise, or the selected samples of them, and The power of samples that include noise only; that is those signals outside the signal bandwidth but within the system bandwidth.

The ratio may be averaged over a selected time interval, and the samples that include signal plus noise may also be selected to estimate the signal to noise ratio per band, packet, sub-packet or sub-carrier of the received signals.

The Noise to Noise Ratio (NNR) $\eta$ of the noise in the noise only samples, and the signal plus noise sub-carriers may also be calculated, so that the signal to noise ratio can be properly scaled.

This method provides for generic, low-complexity, blind SNR estimation that is independent of the characteristics of the signal and the channel; and can be used for all OFDM and SC signals.

When the received RF signal includes multiple sub-carriers, the method may comprise:

Sampling the received signals by analogue to digital converters (ADC), with a sampling frequency that is more than twice the signal bandwidth.

Performing a fast Fourier transform (FFT) on a block of samples to derive the values of each subcarrier.

Estimating the power of each received sub-carrier of the received RF signals.

Calculating the Noise to Noise Ratio (NNR) $\eta$, of the noise in the noise only sub-carriers and the signal plus noise sub-carriers.

Calculating the estimated Signal to Noise Ratio $\hat{\psi}$ as follows:

$$\hat{\psi} = \frac{\sum_{j \in J} \sum_{k \in K} |Y(j,k)|^2}{\sum_{j \in J} \sum_{q \in Q} |Y(j,q)|^2} \eta - 1$$

Where $|Y(j,k)|$ represents the amplitude of the signal carried by each of K sub-carriers carrying signal plus noise, and j represents each of J instants.

Where $|Y(j,q)|$ represents the amplitude of the signal carried by the sub-carriers carrying no signal (noise only), and j represents each of J instants.

The estimated Signal to Noise Ratio $\hat{\psi}$ may be calculated as follows:

First, calculating the sum of the square amplitudes of the signals in the sub-carriers carrying signals (signal plus noise).

Next, calculating the sum of the square amplitudes of the signal in the sub-carriers carrying no signal (noise only).

Next, summing the sum of the square amplitudes of the signals in the sub-carriers carrying signals (signal plus noise) at each instant j over a time interval J to produce a first summation.

Next, summing the sum of the square amplitudes of the signals in the sub-carriers carrying no signal (noise only) at each instant j over a time interval J to produce a second summation.

Then, taking the ratio of the first and second summations, multiplying by the Noise to Noise ratio (NNR) $\eta$, and subtracting 1.

The method can be applied over only part of the signal spectrum (that contains both signal and noise) which allows an estimate of SNR for only part of the spectrum, such as a band, packet or subcarrier.

For colored noise, the Noise to Noise Ratio (NNR) may be calculated as follows when the transmitter is turned off:

Summing the estimated power of each sub-carrier within the signal bands of the received RF signals to produce a first sum.

Summing the estimated power of each sub-carrier within the noise only bands of the received RF signals to produce a second sum.

Summing the value of each of the first sums calculated at different instants over a first time interval to produce a third sum.

Summing the value of each of the second sums calculated at different instants over the first time interval to produce a fourth sum.

Calculating the ratio of the third and fourth sums.

For white noise, the NNR is a known constant:

$$\eta = \|Q\|/\|K\|$$

where $\|\circ\|$ represents the number of subcarriers in the respective set.

The method may be applied with any type of noise, such as white noise, Gaussian noise or coloured noise.

The Signal to noise ratio estimated by use of the method, may be used at the receiver to improve performance; such as Automatic Gain Control (AGC), Automatic Frequency Control (AFC), adaptive filtering or channel estimation.

Alternatively the Signal to noise ratio estimated by use of the method, may be fed back to the transmitter to improve performance; such as adaptive channel and carrier frequency selection.

In some situations of colored noise/interference it may be useful to switch off the transmitter at the end of the preamble for a short time to allow the receiver to estimate the Noise to Noise Ratio and adjust its other receiver parameters such AGC gains and carrier frequencies.

The method is independent of the characteristics of the signal and the channel. Therefore the proposed SNR estimation method may be applied to any signal constellation.

The proposed method is also equally applicable to frequency selective and fading channels.

Sometimes only the estimation of the noise variance (rather than the SNR) is required. Alternatively, the means square error (MSE) or the normalized MSE of the SNR estimate can be used.

The impact of wideband interference can be treated the same as noise. However, the method is more applicable to scenarios where the interference has wider bandwidth than the target signal so that the interference occurs at both data subcarriers and the guard-band subcarriers. For example, a Wi-Fi receiver can use this method to measure the interference from ultra-wideband radios.

The proposed method does not require the existence of virtual subcarriers in the transmitter on which no signal is transmitted. However, almost all practical OFDM systems have guard-band virtual subcarriers towards the ends of the channel bandwidth. In the event all subcarriers were used for data and pilot signals, the receiver can adopt an oversampling strategy to make use of the proposed method. After oversampling, it is expected that the signal is concentrated in the middle of the spectrum while the noise falls into the whole spectrum.

In a second aspect, the invention is a communications receiver with the ability to estimate the signal to noise ratio (SNR) in the received signals by directly estimating the power ratio, in the received signal, between the part of the frequency spectrum of the received signal that contains only noise, and the part of the spectrum that contains both signal and noise; and averaging this value over a time interval.

In a third aspect, the invention is software for performing the method.

BRIEF DESCRIPTION OF THE DRAWINGS

An example of the invention will now be described with reference to the accompanying drawings, in which.

BEST MODES OF THE INVENTION

Figure 1:
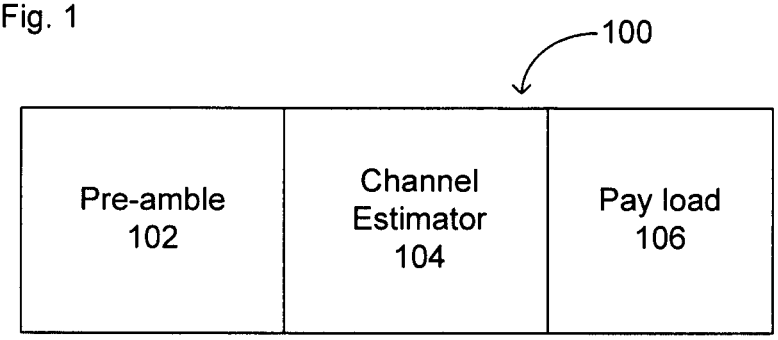
FIG. 1 is diagram of the structure of a generic data packet in the time domain.

The format of a generic OFDM or SC communications packet 100 is shown in FIG. 1.

The packet has three fields: Preamble 102, Channel Estimation (CE) 104 and Payload 106. The preamble 102 enables the receiver (RX) to reliably detect the arrival timing of the packet, and to estimate and correct the carrier frequency offset. The Channel Estimation (CE) field 104 allows the channel to be estimated so that a time-domain or frequency-domain equalization can be easily performed to decode the Payload field. The Payload 106, in the case of OFDM, comprises a string of OFDM symbols In the frequency domain of the received sampled sequence with a sampling frequency more than two times of the signal bandwidth, almost all practical OFDM and SC systems define a set of subcarriers on which no signal is transmitted. These empty carriers are normally located at the two ends of the channel bandwidth. As a result the transmitted OFDM and SC data packets 106 have a signal bandwidth 200, and a noise bandwidth 202 that is wider than the signal bandwidth 200; see FIG. 2.

Of course there is noise within the signal bandwidth as well as signal, but outside of the signal bandwidth there are two frequency sub-bands 204 and 206 that contain only noise.

Figure 3:
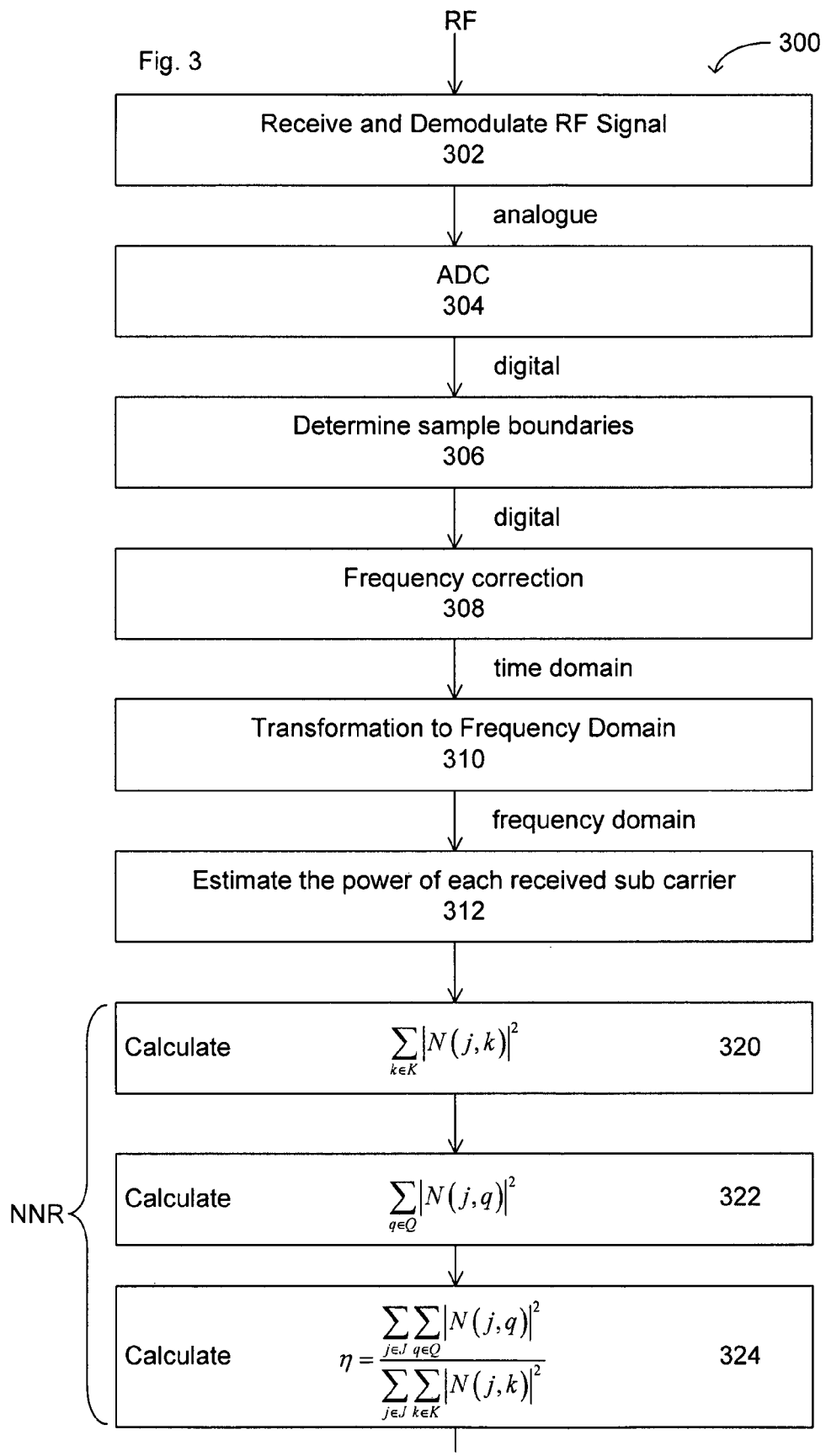
FIG. 3 is a flow diagram of the process of estimating the signal to noise ratio of the received signal.
Figure 4:
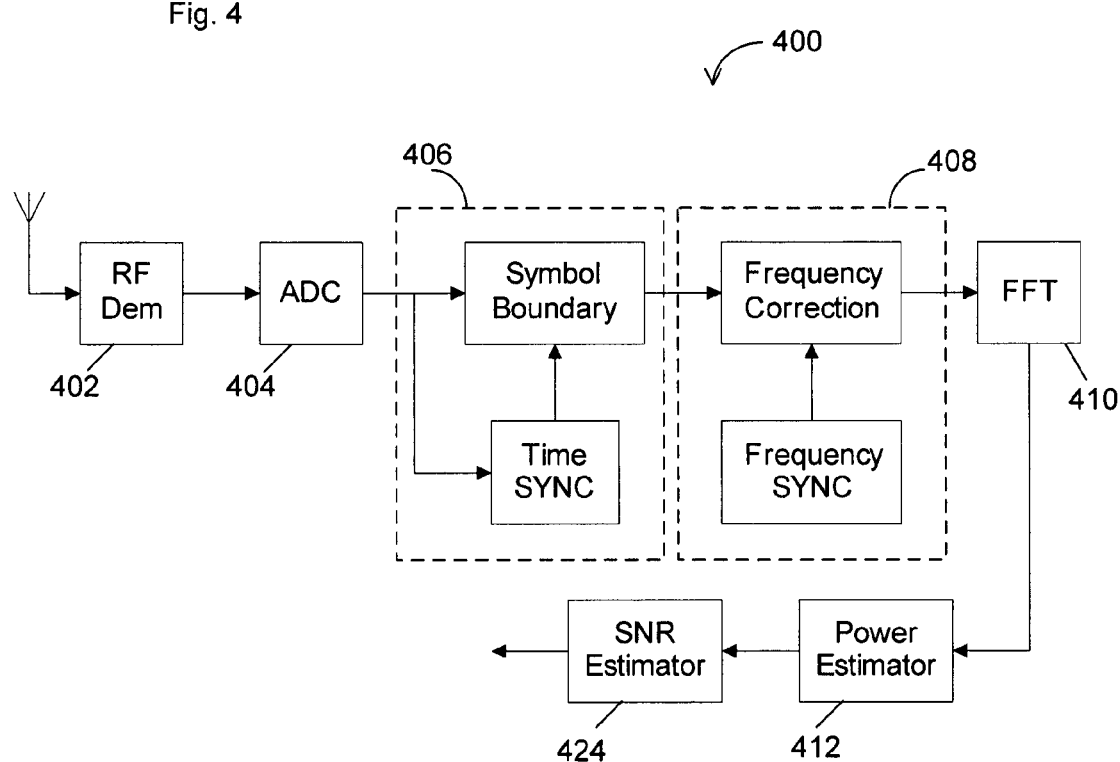
FIG. 4 is a block diagram of a receiver implementing the process of FIG. 3.

Referring now to FIGS. 3 and 4, the process 300 and additional hardware required 400 to estimate the signal to noise ratio will now be described in the context of an OFDM receiver.

First it is necessary to receive the Radio Frequency (RF) transmitted signal and demodulate it 302; for instance using an RF receiver and demodulator 402.

Then it is necessary to sample the demodulated analogue signal to digitize it 304; for instance using an Analogue to Digital Converter (ADC) 404. The result is a series of digital samples.

The symbol boundaries are then determined using a time synchronization of the digital samples 306, 406.

Then, frequency correction takes place 308 by means of a frequency synchronization 408.

The resulting digital signal is then transformed to the frequency domain 310, for instance using the Fast Fourier Transform, 410.

In the frequency domain it is then possible to estimate the power 312 of each received sub-carrier, for instance using spectrum analysis 412.

Then the Noise to Noise Ratio (NNR) of the noise in the noise only sub-carriers and in the signal plus noise sub-carriers is calculated 324 as follows:

The instantaneous Noise to Noise Ratio (NNR) of colored noise, at any instant when is TX is not transmitting is calculated from:

The sum of the estimated power of each sub-carrier k within the signal bandwidth 200; that is:

$$\sum_{k \in K} |N(j,k)|^2 \quad \quad 320$$

Divided by the sum of the estimated power of each sub-carrier q across the noise only bands 204 and 206. That is:

$$\sum_{q \in Q} |N(j,q)|^2 \quad \quad 322$$

Over time an average for the Noise to Noise ratio (NNR) $\eta$ is given by summing each of the instantaneous NNRs over a time interval J comprising j instances:

$$\eta = \frac{\sum_{j \in J} \sum_{q \in Q} |N(j,q)|^2}{\sum_{j \in J} \sum_{k \in K} |N(j,k)|^2}. \quad \quad 324$$

Using the NNR it is then possible to calculate an estimated Signal to Noise Ratio (SNR) from the amplitude of the signal in each sub-carrier in the received signal as follows:

First, calculating the sum of the square amplitudes of the signals in the sub-carriers carrying signals (signal plus noise):

$$\sum_{k \in K} |Y(j,k)|^2 \quad \quad 26$$

Next, calculating the sum of the square amplitudes of the signal in the sub-carriers carrying no signal (noise only):

$$\sum_{q \in Q} |Y(j,q)|^2 \quad \quad 328$$

Next summing the sum of the square amplitudes of the signals in the sub-carriers carrying signals (signal plus noise) at each instant j over a time interval J:

$$\sum_{j \in J} \sum_{k \in K} |Y(j,k)|^2 \quad \quad 330$$

Next summing the sum of the sum of the square amplitudes of the signals in the sub-carriers carrying no signal (noise only) at each instant j over a time interval J:

$$\sum_{j \in J} \sum_{q \in Q} |Y(j,q)|^2 \quad \quad 332$$

Then taking the ratio of 330 and 332, multiplying by the Noise to Noise ratio (NNR) $\eta$, and subtracting 1:

$$\hat{\psi} = \frac{\sum_{j \in J} \sum_{k \in K} |Y(j,k)|^2}{\sum_{j \in J} \sum_{q \in Q} |Y(j,q)|^2} \eta - 1 \quad \quad 334$$

These calculations are performed using an SNR estimator module 424.

It is a trivial matter to extend the method to multiple-input multiple-output (MIMO) OFDM and MIMO SC systems. The algorithm can be used directly before or after the MIMO equalizer. When used before the MIMO equalizer the SNR for a particular receiver can be measured. The MIMO equalizer resolves the MIMO channel into multiple independent channels, and the SNR on each resolved channel can thus be measured.

Figure 5:
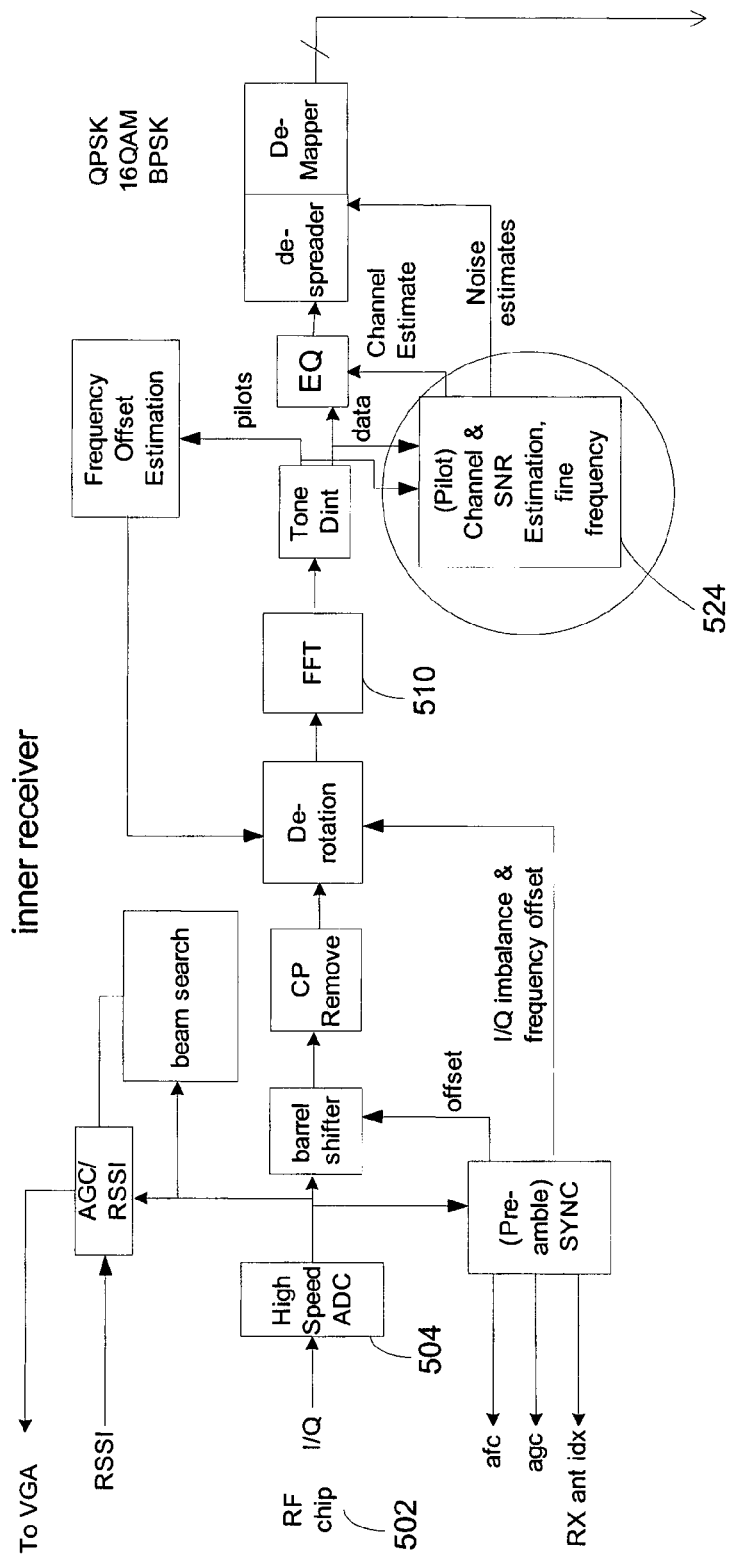
FIG. 5 is a block diagram of a receiver implementing the process.

Referring now to FIG. 5, the architecture of a receiver that implements the invention will now be described:

In general the receiver has the same organization as the more general receiver shown in FIG. 4. RF chip 502 manages the reception and demodulation of the RF signal. The high speed ADC 504 samples the analogue input signal for conversion to digital form. After conversion to the frequency domain 510, the Signal to noise ratio is developed 524.

Figure 2:
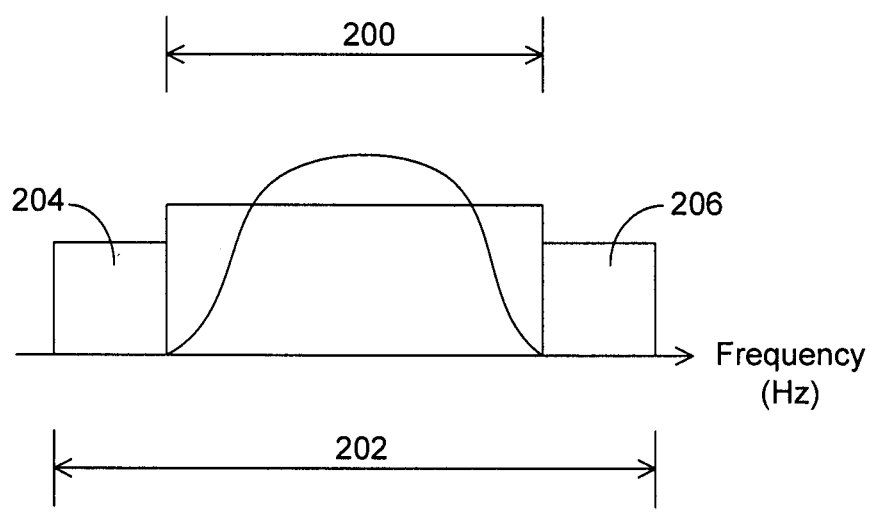
FIG. 2 is a frequency domain diagram of the generic data packet.

Finally, the method may be used in Single Carrier (SC) systems. In this case the received signal is first over-sampled and then a sequence of samples is converted to the Frequency Domain by fast Fourier transform (FFT). In the FD, it is expected that the signal is concentrated in the middle of the spectrum while the noise falls into the whole spectrum as shown in FIG. 2.

REFERENCES

[1] Y. Linn, "A Carrier-Independent Non-Data-Aided Real-Time SNR Estimator for M-PSK and D-MPSK Suitable for FPGAs and ASICs," *IEEE Trans. on Circuits and Systems*, Vol. 56, No. 7, pp. 1525-1538, July 2009.

[2] D. R. Pauluzzi and N. C. Beaulieu, "A comparison of SNR estimation techniques for the AWGN channel," *IEEE Trans. Commun.*, Vol. 48, No. 10, pp. 1681-1691, October 2000.

[3] J. Hua et al, "Novel Scheme for Joint Estimation of SNR, Doppler, and Carrier Frequency Offset in Double-Selective Wireless Channels," *IEEE Trans. on Vehicular Tech.*, Vol. 58, No. 3, pp. 1204-1217, March 2009.

[4] S. Kim, H. Yu, J. Lee and D. Hong, "Low Bias Frequency Domain SNR Estimator Using DCT in Mobile Fading Channels," *IEEE Trans. on Wireless Commun.*, Vol. 8, No. 1, pp. 45-50, January 2009.

[5] A. Doukas and G. Kalivas, "SNR Estimation for Low Bit Rate OFDM Systems in AWGN Channel," *Proc. IEEE Conf. ICNICONSMCL 2006. IEEE Conf. ISWCS*, September 2009.

[6] T. Cui and C. Tellambura, "Power delay profile and noise variance estimation for OFDM," *IEEE Commun. Lett.*, Vol. 10, No. 1, pp. 25-27, January 2006.

[7] F. Socheleau, A. Aïssa-El-Bey and S. Houcke, "Non Data-Aided SNR Estimation of OFDM Signals," *IEEE Commun. Lett.*, Vol. 12, No. 11, pp 813-815, November 2008.

[8] R. Lopez-Valcarce and C. Mosquera, "Maximum likelihood SNR estimation for asynchronously oversampled OFDM signals," pp. 26-30, *Proc. IEEE Conf SPAWC*, July 2008.

[9] C. Aldana, A. Salvekar, J. Tallado, and J. Cioffi, "Accurate noise estimates in multicarrier systems," in *Proc. IEEE Veh. Technol. Conf.*, Boston, Mass., September 2000, vol. 1, pp. 434-438.

The invention claimed is:

1. A method for estimating signal-to-noise ratio in an orthogonal frequency division multiplexing radio frequency receiver, the method comprising:
   receiving a radio frequency transmitted signal having a signal bandwidth and a noise bandwidth that is wider than the signal bandwidth, the radio frequency transmitted signal comprising multiple sub-carriers, the multiple sub-carriers comprising a plurality of noise only sub-carriers within the noise bandwidth but outside the signal bandwidth and a plurality of signal plus noise sub-carriers within the signal bandwidth;
   demodulating the radio frequency transmitted signal;
   sampling the demodulated radio frequency transmitted signal to produce a series of digital samples;
   transforming a digital signal, based on the series of digital samples, to a frequency domain;
   in the frequency domain, estimating power of each of the multiple sub-carriers;
   calculating a noise to noise ratio of noise in the noise only sub-carriers and noise in the signal plus noise sub-carriers, based on the estimated power of each of the noise only sub-carriers and based on the estimated power of each of the signal plus noise sub-carriers; and
   calculating a signal to noise ratio, based on the noise to noise ratio.

2. The method of claim 1, further comprising sampling the demodulated radio frequency transmitted signal at more than twice the signal bandwidth to produce the series of digital samples.

3. The method of claim 1, wherein calculating the noise to noise ratio comprises:
   calculating a plurality of first sums over a time interval;
   calculating a plurality of second sums over the time interval;
   calculating a third sum based on the plurality of second sums;
   calculating a fourth sum based on the plurality of first sums;
   calculating a ratio of the third sum to the fourth sum;
   wherein calculating each of the plurality of first sums comprises calculating the each first sum based on an instantaneous estimated power each of the signal plus noise sub-carriers; and
   wherein calculating each of the plurality of second sums comprises calculating the each second sum based on an instantaneous estimated power each of the noise only sub-carriers.

4. The method of claim 1, wherein calculating the signal to noise ratio comprises:
   calculating a plurality of first sums over a time interval;
   calculating a plurality of second sums over the time interval;
   calculating a third sum based on the plurality of first sums;
   calculating a fourth sum based on the plurality of second sums;
   calculating a ratio of the third sum to the fourth sum multiplied by the noise to noise ratio and subtracting one;
   wherein calculating each of the plurality of first sums comprises calculating the each first sum based on an instantaneous signal amplitude of signal of each of the signal plus noise sub-carriers; and
   wherein calculating each of the plurality of second sums comprises calculating the each second sum based on an instantaneous signal amplitude of signal of each of the noise only sub-carriers.

5. The method of claim 1, further comprising estimating power of each of the multiple sub-carriers in the frequency domain using spectrum analysis.

6. The method of claim 1, further comprising:
   using a time synchronization of the digital samples to determine symbol boundaries; and
   performing frequency correction based on the symbol boundaries via a frequency synchronization to produce the digital signal.

7. An orthogonal frequency division multiplexing radio frequency receiver comprising:
   a radio frequency chip configured to receive a radio frequency transmitted signal having a signal bandwidth and a noise bandwidth that is wider than the signal bandwidth, the radio frequency transmitted signal comprising multiple sub-carriers, the multiple sub-carriers comprising a plurality of noise only sub-carriers within the noise bandwidth but outside the signal bandwidth and a plurality of signal plus noise sub-carriers within the signal bandwidth;
   the radio frequency chip further configured to demodulate the radio frequency transmitted signal;
   an analogue to digital converter configured to sample the demodulated radio frequency transmitted signal to produce a series of digital samples;
   a Fast Fourier Transform configured to transform a digital signal, based on the series of digital samples, to a frequency domain;
   a power estimator configured to estimate power of each of the multiple sub-carriers in the frequency domain;
   a signal to noise estimator configured to calculate a noise to noise ratio of noise in the noise only sub-carriers and noise in the signal plus noise sub-carriers, based on the estimated power of each of the noise only sub-carriers and based on the estimated power of each of the signal plus noise sub-carriers, and calculate a signal to noise ratio, based on the noise to noise ratio.

8. The receiver of claim 7, wherein the analogue to digital converter is further configured to sample the demodulated radio frequency transmitted signal at more than twice the signal bandwidth to produce the series of digital samples.

9. The receiver of claim 7, wherein the signal to noise estimator is further configured to calculate the noise to noise ratio by:
- calculating a plurality of first sums over a time interval;
- calculating a plurality of second sums over the time interval;
- calculating a third sum based on the plurality of second sums;
- calculating a fourth sum based on the plurality of first sums;
- calculating a ratio of the third sum to the fourth sum;
- wherein calculating each of the plurality of first sums comprises calculating the each first sum based on an instantaneous estimated power each of the signal plus noise sub-carriers; and
- wherein calculating each of the plurality of second sums comprises calculating the each second sum based on an instantaneous estimated power each of the noise only sub-carriers.

10. The receiver of claim 7, wherein the signal to noise estimator is further configured to calculate the signal to noise ratio by:
- calculating a plurality of first sums over a time interval;
- calculating a plurality of second sums over the time interval;
- calculating a third sum based on the plurality of first sums;
- calculating a fourth sum based on the plurality of second sums;
- calculating a ratio of the third sum to the fourth sum multiplied by the noise to noise ratio and subtracting one;
- wherein calculating each of the plurality of first sums comprises calculating the each first sum based on an instantaneous signal amplitude of signal of each of the signal plus noise sub-carriers; and
- wherein calculating each of the plurality of second sums comprises calculating the each second sum based on an instantaneous signal amplitude of signal of each of the noise only sub-carriers.

11. The receiver of claim 7, wherein the power estimator is further configured to estimate power of each of the multiple sub-carriers in the frequency domain using spectrum analysis.

12. The receiver of claim 7, the receiver configured to:
- use a time synchronization of the digital samples to determine symbol boundaries; and
- perform frequency correction based on the symbol boundaries via a frequency synchronization to produce the digital signal.

\* \* \* \* \*